United States Patent
Kiyokawa et al.

(10) Patent No.: US 10,300,945 B2
(45) Date of Patent: May 28, 2019

(54) VEHICLE CONTROL APPARATUS

(71) Applicant: AISIN SEIKI KABUSHIKI KAISHA, Kariya-shi, Aichi-ken (JP)

(72) Inventors: Yusuke Kiyokawa, Toyota (JP); Tomoyuki Matsuba, Obu (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 15/704,089

(22) Filed: Sep. 14, 2017

(65) Prior Publication Data

US 2018/0222471 A1 Aug. 9, 2018

(30) Foreign Application Priority Data

Feb. 3, 2017 (JP) ................. 2017-018222

(51) Int. Cl.
| | |
|---|---|
| B62D 15/02 | (2006.01) |
| B60W 30/06 | (2006.01) |
| G07C 5/04 | (2006.01) |
| B60T 13/74 | (2006.01) |

(52) U.S. Cl.
CPC ......... *B62D 15/0285* (2013.01); *B60W 30/06* (2013.01); *B62D 15/027* (2013.01); *G07C 5/04* (2013.01); *B60T 13/74* (2013.01)

(58) Field of Classification Search
CPC . B62D 15/0285; B62D 15/027; B60W 30/06; G07C 5/04
See application file for complete search history.

(56) References Cited

U.S. PATENT DOCUMENTS

| | | | |
|---|---|---|---|
| 8,085,167 B2 | 12/2011 | Tanaka et al. | |
| 9,031,731 B2 | 5/2015 | Choi et al. | |
| 2010/0070138 A1* | 3/2010 | Schoening | B60Q 9/004 701/42 |
| 2010/0106372 A1* | 4/2010 | Watanabe | B62D 15/0285 701/41 |
| 2017/0028985 A1 | 2/2017 | Kiyokawa | |

FOREIGN PATENT DOCUMENTS

| | | |
|---|---|---|
| EP | 2135779 A1 | 12/2009 |
| EP | 3124995 A1 | 2/2017 |
| JP | 2008-114776 A | 5/2008 |
| JP | 2014-205479 A | 10/2014 |

OTHER PUBLICATIONS

Communication dated Apr. 19, 2018 from the European Patent Office in counterpart European application No. 17190786.8.

* cited by examiner

Primary Examiner — Jelani A Smith
Assistant Examiner — Kelly D Williams
(74) Attorney, Agent, or Firm — Sughrue Mion, PLLC (57) ABSTRACT

A vehicle control apparatus includes: a clocking section which clocks time after an operation section is operated until a certain period of time elapses; and a vehicle control section which starts a first control in a case where a vehicle is stopped within the certain period of time after the operation section is operated, the first control corresponding to a control executed in a case where the operation section is operated in a state where the vehicle is stopped.

3 Claims, 8 Drawing Sheets

VEHICLE CONTROL APPARATUS

CROSS REFERENCE TO RELATED APPLICATIONS

This application is based on and claims priority under 35 U.S.C. § 119 to Japanese Patent Application 2017-018222, filed on Feb. 3, 2017, the entire contents of which are incorporated herein by reference.

TECHNICAL FIELD

This disclosure relates to a vehicle control apparatus.

BACKGROUND DISCUSSION

In the related art, a technology of a vehicle control apparatus which executes a specific control, such as parking assist, in a case of receiving an operation of a driver after a vehicle is stopped, is known.

Examples of the related art include JP 2008-114776A and JP 2014-205479A.

However, there is a case where a timing at which a vehicle control apparatus determines that a vehicle is stopped is later than a timing at which a driver feels that the vehicle is stopped. In such a case, even in a case where the driver performs an operation at a time point when the driver feels that the vehicle is stopped, the vehicle control apparatus determines that the operation of the driver is received in a non-stopped state, and thus, there is a case where it is difficult to execute a control according to the intention of the driver. Meanwhile, it is difficult to advance the timing at which the vehicle control apparatus determines that the vehicle is stopped due to a reason related to the control of the vehicle.

Thus, a need exists for a vehicle control apparatus which is not susceptible to the drawback mentioned above.

SUMMARY

As an example, a vehicle control apparatus according to an aspect of this disclosure includes: a clocking section which clocks time after an operation section is operated until a certain period of time elapses; and a vehicle control section which starts a first control in a case where a vehicle is stopped within the certain period of time after the operation section is operated. The first control corresponds to a control executed in a case where the operation section is operated in a state where the vehicle is stopped.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view illustrating a state where a part of a vehicle interior of a vehicle according to Embodiment 1 is seen through;

DETAILED DESCRIPTION

Hereinafter, an example in which a vehicle control apparatus and a vehicle control system of an embodiment are loaded on a vehicle 1 will be described.

Embodiment 1

Figure 1:
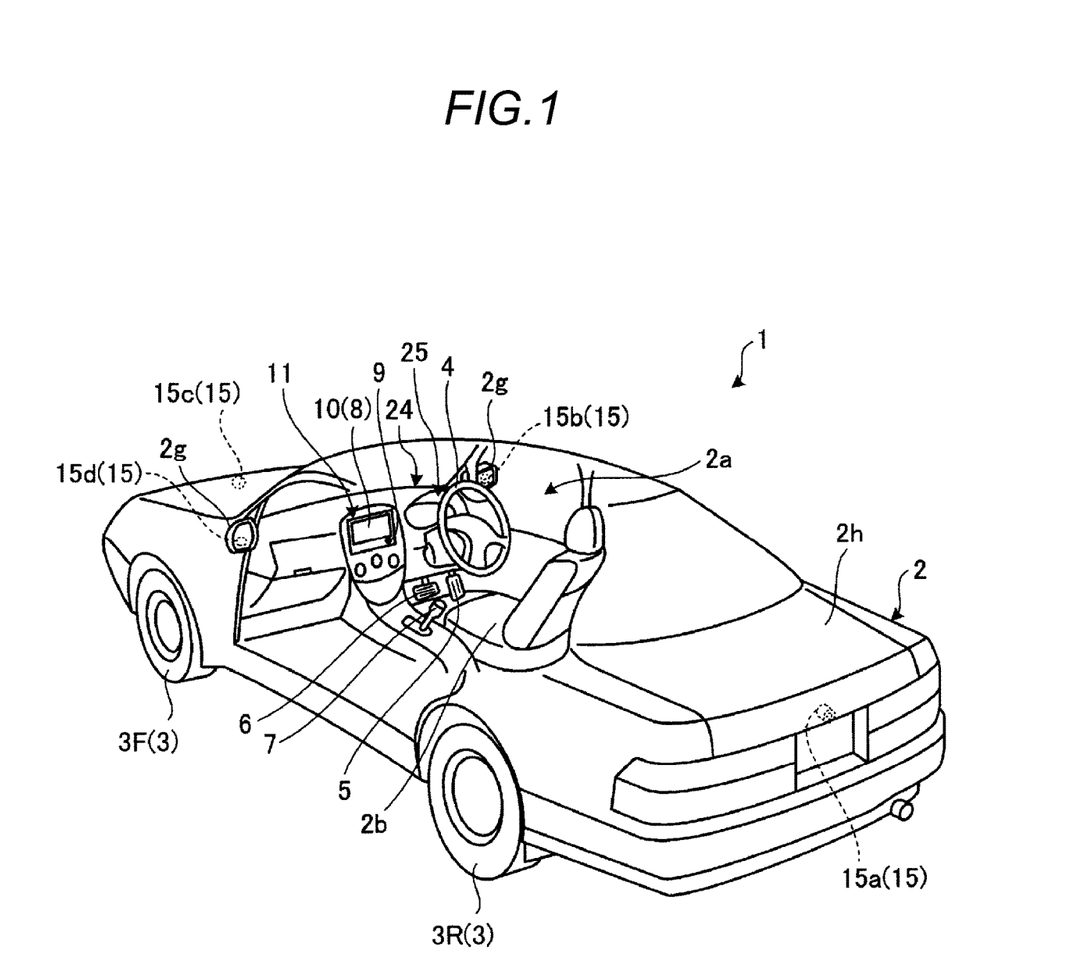

FIG. 1 is an exemplary perspective view illustrating a state where a part of a vehicle interior of the vehicle 1 according to the embodiment is seen through. In the embodiment, the vehicle 1 on which the vehicle control apparatus is loaded, for example, may be a car in which an internal combustion engine which is not illustrated is used as a driving source, that is, an internal combustion engine vehicle, may be a car in which an electric motor which is not illustrated is used as a driving source, that is, an electric car or a fuel-cell vehicle, may be a hybrid car in which both of the internal combustion engine and the electric motor are used as a driving source, or may be a car including another type of driving source. In addition, the vehicle 1 can load various types of a speed change device thereon, and can load various devices, for example, a system or a component, necessary for driving the internal combustion engine or the electric motor.

As illustrated in FIG. 1, the vehicle 1 is, for example, a four-wheeled vehicle, and includes two left and right front wheels 3F, and two left and right rear wheels 3R. Any of the four wheels 3 are configured to be capable of steering. In addition, it is possible to set a method, the number, or the layout of the apparatus related to the driving of the wheels 3 in the vehicle 1 in various manners.

As illustrated in the example of FIG. 1, a vehicle body 2 configures a vehicle interior 2a on which an occupant who is not illustrated gets. In the vehicle interior 2a, in a state where a driver who is an occupant faces a seat 2b, a steering section 4, an acceleration operation section 5, a brake operation section 6, and a speed change operation section 7 are provided. The steering section 4 is, for example, a steering wheel which protrudes from a dashboard 24, the acceleration operation section 5 is, for example, a gas pedal which is positioned under the foot of the driver, the brake operation section 6 is, for example, a brake pedal which is positioned under the foot of the driver, and the speed change operation section 7 is, for example, a shift lever which protrudes from a center console. In addition, the steering section 4, the acceleration operation section 5, the brake operation section 6, the speed change operation section 7 and the like are not limited thereto.

In addition, in the vehicle interior 2a, a display device 8 which functions as a display output section, and a voice output device 9 which functions as a voice output section are provided. The display device 8 is, for example, a liquid crystal display (LCD) or an organic electroluminescent display (OELD). The voice output device 9 is, for example, a speaker. In addition, the display device 8 is, for example, covered with a transparent operation input section 10, such as a touch panel. An occupant can visually recognize an image displayed on a display screen of the display device 8 via the operation input section 10. In addition, the occupant can execute an operation input by operating the operation input section 10 by touching, pushing, or moving the operation input section 10 by a finger or the like at a position which corresponds to the image displayed on the display screen of the display device 8. The display device 8, the voice output device 9, the operation input section 10 and the like are provided, for example, on a monitor device 11 positioned in a center portion in a vehicle width direction, that is, in a leftward-and-rightward direction of the dashboard 24. The monitor device 11 can include the operation input section which is not illustrated, such as a switch, a dial, a joystick, or a push button. In addition, the voice output device which is not illustrated can be provided at another position in the vehicle interior 2a different from that of the monitor device 11, and the voice can be output from a voice output device which is different from the voice output device 9 of the monitor device 11. In addition, the monitor device 11 can also be used, for example, as a navigation system or an audio system.

In addition, as illustrated in the example in FIG. 1, in the vehicle body 2, as a plurality of imaging sections 15, for example, four imaging sections 15a to 15d are provided. The imaging section 15 is a digital camera which has an imaging element, such as a charge coupled device (CCD) or a CMOS image sensor (CIS), embedded therein. The imaging section 15 can output video data at a predetermined frame rate. The imaging section 15 consecutively images external environment around the vehicle body 2 including a road surface on which the vehicle 1 can move or a region in which the vehicle 1 can be parked, and outputs the imaged images as imaged image data.

The imaging section 15a is positioned, for example, in an end portion on a rear side of the vehicle body 2, and is provided in a wall section below a door 2h of a rear trunk. The imaging section 15b is, for example, positioned in an end portion on a right side of the vehicle body 2, and is provided in a door mirror 2g on the right side. The imaging section 15c is, for example, positioned in an end portion on a front side of the vehicle body 2, that is, on a front side in the forward-rearward direction of the vehicle, and is provided in a front bumper or the like. The imaging section 15d is, for example, positioned in an end portion on a left side of the vehicle body 2, that is, on a left side in the vehicle width direction, and is provided in the door mirror 2g which functions as the protrusion section on the left side. The number of imaging sections 15 is not limited to four, and may be five or more or may be one.

Figure 2:
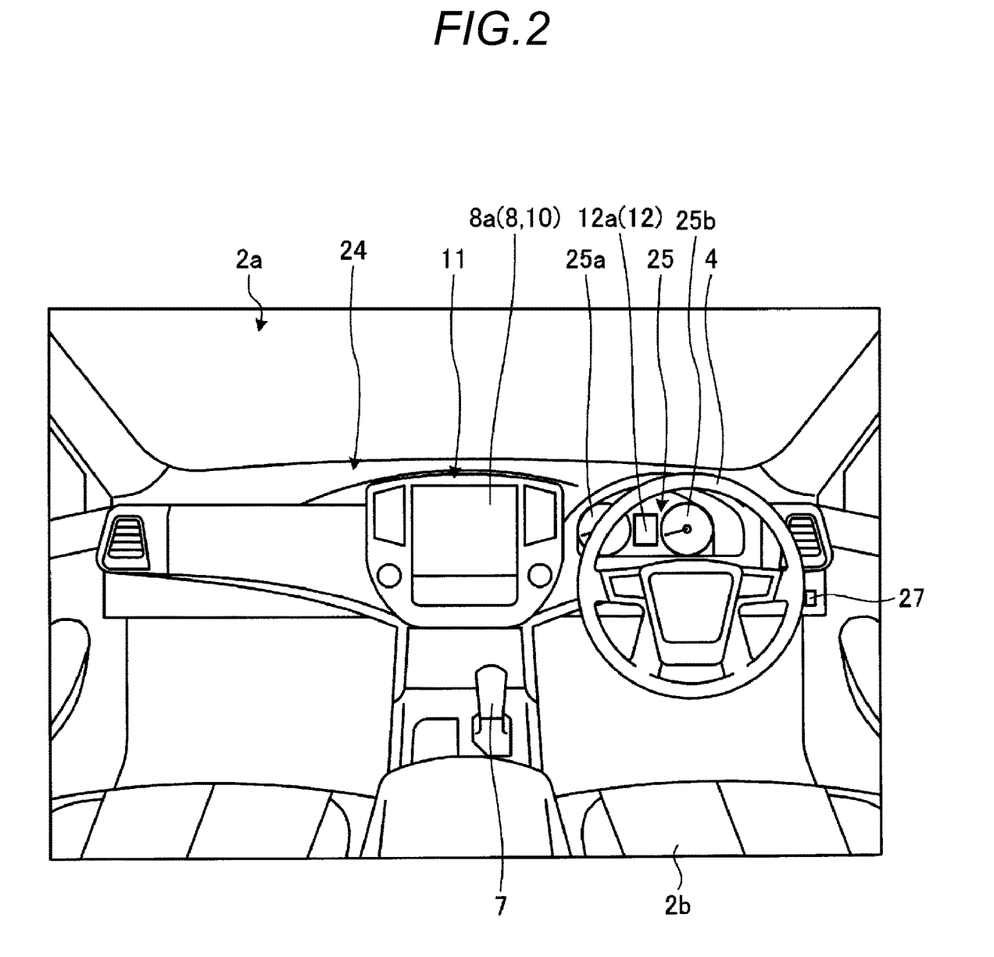
FIG. 2 is an example of a dashboard of the vehicle according to Embodiment 1, and a view in a viewing field from a rear part of the vehicle.

FIG. 2 is an example of the dashboard 24 of the vehicle 1 according to the embodiment, and is a view in the viewing field from the rear part of the vehicle. As illustrated in FIG. 2, in the vehicle interior 2a, a display device 12 which is different from the display device 8 is provided. The display device 12 is, for example, provided in an instrument panel section 25 of the dashboard 24, and is positioned between a speed display section 25a and a rotation speed display section 25b substantially at the center of the instrument panel section 25. The size of a screen 12a of the display device 12 is smaller than the size of a screen 8a of the display device 8. On the display device 12, an image which mainly shows information related to parking assist of the vehicle 1 can be displayed. An information amount displayed on the display device 12 may be smaller than an information amount displayed on the display device 8. The display device 12 is, for example, an LCD or an OELD. In addition, on the display device 8, the information displayed on the display device 12 may be displayed. The display device 12 may be a touch panel.

In addition, as illustrated in FIG. 2, in the dashboard 24, a switch 27 is provided. The switch 27 is an example of an operation section in the embodiment, and for example, is a push button which can input an operation as being pressed down by the driver. For example, when an operation, such as pressing down the switch 27 by the driver, is performed, a sensing signal is sent to an ECU. The position of the switch 27 illustrated in FIG. 2 is an example, and is not limited thereto. In addition, the one who operates the switch 27 is not limited to the driver, and may be a fellow passenger.

The ECU of the embodiment executes the plural modes of parking assist. The driver or the fellow passenger presses down the switch 27 and selects a mode of parking assist which is desired to be started. The switch 27 receives the operation of pressing down by the driver or the fellow passenger. The ECU determines the selected mode by the number of times of pressing-down of the switch 27. In the embodiment, the switch 27 is a parking assist start switch. Each mode of the parking assist in the embodiment will be described later.

In addition, the operation section may be capable of receiving the operation of the driver or the fellow passenger, or is not limited to the push button type switch 27. For example, the operation section may be an image displayed on the touch panel of the display device 8 or the display device 12.

Figure 3:
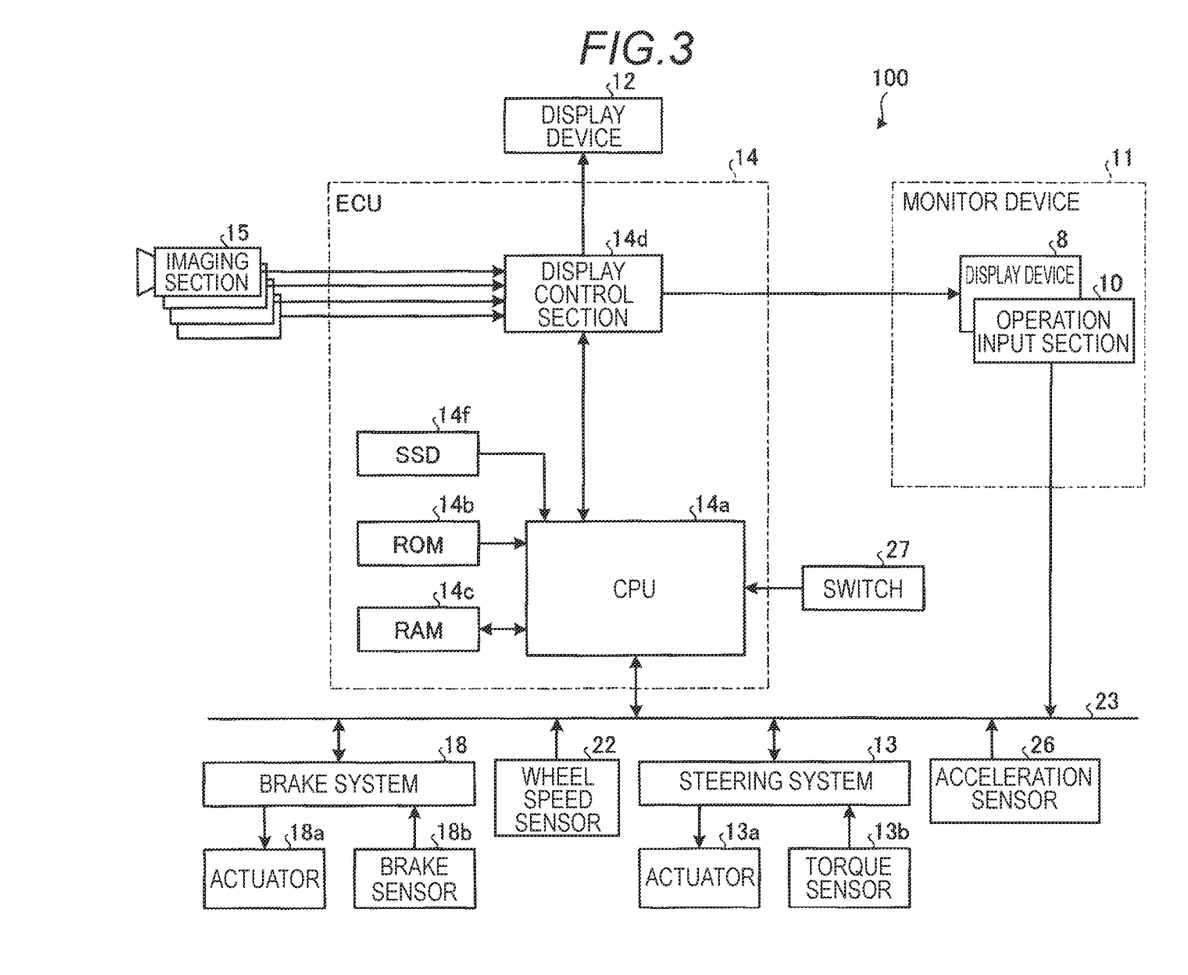
FIG. 3 is a view illustrating an example of a hardware configuration of the vehicle control system according to Embodiment 1.

FIG. 3 is a view illustrating an example of a hardware configuration of a vehicle control system 100 according to the embodiment. As illustrated in FIG. 3, in the vehicle control system 100, in addition to an ECU 14, the monitor device 11, a steering system 13 and the like, a brake system 18, a wheel speed sensor 22, an acceleration sensor 26 and the like are electrically connected to each other via an in-vehicle network 23 which functions as an electric communication circuit.

The in-vehicle network 23 is configured, for example, as a controller area network (CAN). The ECU 14 can control the steering system 13, the brake system 18 and the like by sending a control signal through the in-vehicle network 23. In addition, the ECU 14 can receive a detection result of a brake sensor 18b, the wheel speed sensor 22, the acceleration sensor 26 and the like, or the operation signal of the operation input section 10 or the like, via the in-vehicle network 23. In addition, the ECU 14 receives the signal which shows that the switch 27 is operated by the driver. The ECU 14 and the switch 27 may be connected to each other by a dedicated communication line, or may be connected to each other via the in-vehicle network 23.

In addition, the vehicle 1 includes the steering system 13 which steers at least two wheels 3. The steering system 13 includes an actuator 13a and a torque sensor 13b. The steering system 13 is electrically controlled by the electronic control unit (ECU) 14 or the like, and operates the actuator 13a. The steering system 13 is, for example, an electric power steering system or a steer by wire (SBW) system. The steering system 13 supplements a steering force by adding a torque, that is, an assist torque, to the steering section 4 by the actuator 13*a*, or steers the wheel 3 by the actuator 13*a*. In this case, the actuator 13*a* may steer one wheel 3, or may steer the plurality of wheels 3. In addition, the torque sensor 13*b* detects, for example, the torque given to the steering section 4 by the driver.

The ECU 14 includes, for example, a central processing unit (CPU) 14*a*, a read only memory (ROM) 14*b*, a random access memory (RAM) 14*c*, a display control section 14*d*, and a solid state drive (SSD) 14*f*.

The CPU 14*a* can read out a program which is installed and stored in a nonvolatile storage device, such as the ROM 14*b*, and can execute arithmetic processing according to the program. The RAM 14*c* temporarily stores various types of data which are used in an arithmetic operation in the CPU 14*a*. In addition, the display control section 14*d* mainly executes image processing in which image data obtained by the imaging section 15 is used or synthesis of the image data displayed on the display device 8 or the display device 12 among the arithmetic processing in the ECU 14. For example, the display control section 14*d* can execute the arithmetic processing or the image processing based on the image data obtained by the plurality of imaging sections 15, can generate an image having a wider viewing field angle, or can generate a virtual overhead image when the vehicle 1 is viewed from above. In addition, the overhead image is also referred to as a planar image.

In addition, the SSD 14*f* is a nonvolatile storage section which can be rewritten, and can store the data even in a case where a power source of the ECU 14 is off. In addition, the CPU 14*a*, the ROM 14*b*, the RAM 14*c* and the like are integrated with each other in the same package. In addition, the ECU 14 may have a configuration in which another logical arithmetic processor, such as a digital signal processor (DSP) or a logical circuit, is used instead of the CPU 14*a*. In addition, a hard disk drive (HDD) may be provided instead of the SSD 14*f*, or the SSD 14*f* or the HDD may be provided to be separated from the ECU 14. The ECU 14 is an example of a vehicle control apparatus in the embodiment.

The brake system 18 is, for example, an anti-lock brake system (ABS) which suppresses locking of the brake, an electronic stability control (ESC) which suppresses a skid of the vehicle 1 in cornering, an electric brake system which reinforces a brake force (executes the brake assist), or a brake by wire (BBW). The brake system 18 gives the brake force to the wheel 3 or the vehicle 1 via an actuator 18*a*. In addition, the brake system 18 can detect the locking of the brake, idling of the wheel 3, or a symptom of a spin or skid from a difference in rotation speed of the left and right wheels 3 and the like, and can execute various types of controls. The brake sensor 18*b* is, for example, a sensor which detects the position of a movable section of the brake operation section 6. The brake sensor 18*b* can detect the position of a brake pedal which functions as a movable section. The brake sensor 18*b* includes a displacement sensor. The brake sensor 18*b* sends the sensing signal based on the operation input of the brake operation section 6, for example, the operation input of the brake pedal to the ECU 14 via the brake system 18. Otherwise, the brake sensor 18*b* may employ a configuration in which the sensing signal based on the operation input of the brake pedal is sent to the ECU 14 without using the brake system 18.

The wheel speed sensor 22 is a sensor which detects the rotation amount of the wheel 3 or the rotation speed per unit time. The wheel speed sensor 22 sends a wheel speed pulse number that shows the detected rotation speed as a sensor value to the ECU 14. The wheel speed sensor 22 is configured, for example, by using a hall element or the like. The ECU 14 performs the arithmetic operation with respect to the movement amount or the vehicle speed of the vehicle 1 based on the sensor value obtained from the wheel speed sensor 22, and executes various types of controls. In addition, there is also a case where the wheel speed sensor 22 is provided in the brake system 18. In this case, the ECU 14 obtains the detection result of the wheel speed sensor 22 via the brake system 18.

The acceleration sensor 26 can detect the acceleration of the vehicle 1. In the embodiment, as an example, in the vehicle 1, the acceleration sensor 26 which obtains the acceleration in the forward-rearward direction (longitudinal direction) of the vehicle 1 is provided. The acceleration sensor 26 sends the detected acceleration in the forward-rearward direction of the vehicle 1 to the ECU 14.

In addition, the above-described configuration, the disposition, or the electric connection aspect of the various sensors or actuators is an example, and can be set (changed) in various manners.

Figure 4:
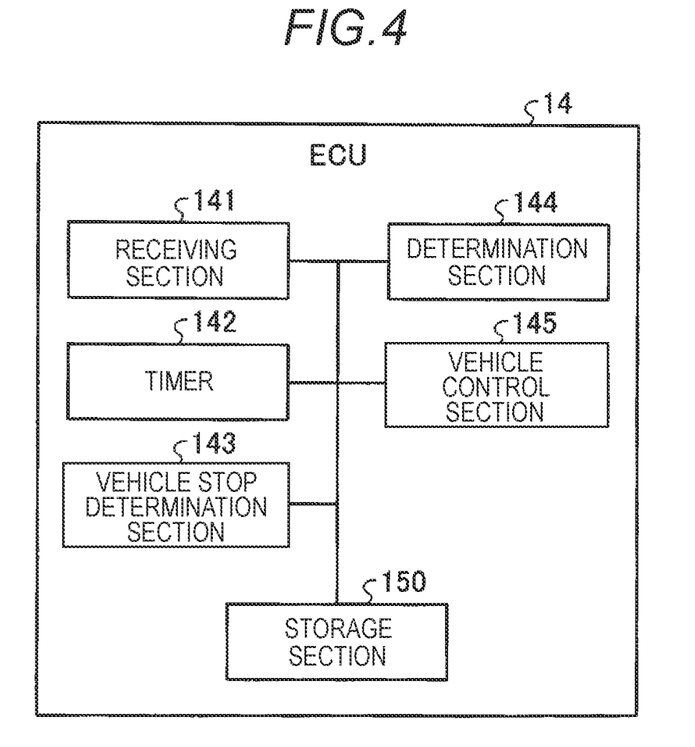
FIG. 4 is a block diagram illustrating an example of a functional configuration of an ECU according to Embodiment 1.

FIG. 4 is a block diagram illustrating an example of a functional configuration of the ECU 14 according to the embodiment. As illustrated in FIG. 4, the ECU 14 includes a receiving section 141, a timer 142, a vehicle stop determination section 143, a determination section 144, a vehicle control section 145, and a storage section 150. Each configuration of the receiving section 141, the timer 142, the vehicle stop determination section 143, the determination section 144, and the vehicle control section 145 which are illustrated in FIG. 4 is realized as the CPU 14*a* executes the program accommodated in the ROM 14*b*. In addition, the configurations may be a configuration to be realized by a hardware circuit.

The storage section 150 is configured of a storage device, such as the SSD 14*f*.

The receiving section 141 receives that an operation of pressing down the switch 27 is performed by the driver. The receiving section 141 notifies the timer 142, the vehicle stop determination section 143, and the vehicle control section 145 that the switch 27 is operated in a case where the receiving section 141 receives that the operation of the switch 27 is operated.

The timer 142 clocks the time after the switch 27 is operated until a certain period of time elapses. For example, the timer 142 starts the clocking in a case where it is notified that the switch 27 is operated from the receiving section 141, and when the certain period of time elapses, it is notified that the certain period of time has elapsed to the vehicle control section 145. In addition, the timer 142 finishes the clocking without standing by until the certain period of time elapses in a case where the vehicle 1 is stopped before the certain period of time elapses, and the timer is reset. The certain period of time is, for example, one second, but is not limited thereto. The timer 142 sends the clocked time to the determination section 144 and the vehicle control section 145. The timer 142 is an example of the clocking section in the embodiment.

The vehicle stop determination section 143 determines whether or not the vehicle 1 is in a stopped state. Specifically, the vehicle stop determination section 143 obtains a detection result of the rotation state of the wheel 3 from the wheel speed sensor 22, and removes noise caused by vibration or the like of the wheel 3. The vehicle stop determination section 143 determines that the vehicle 1 is in a stopped state in a case where it is determined that the rotation of the wheel 3 is completely stopped from the detection result of the rotation state of the wheel 3 from which the noise is removed.

Figure 5:
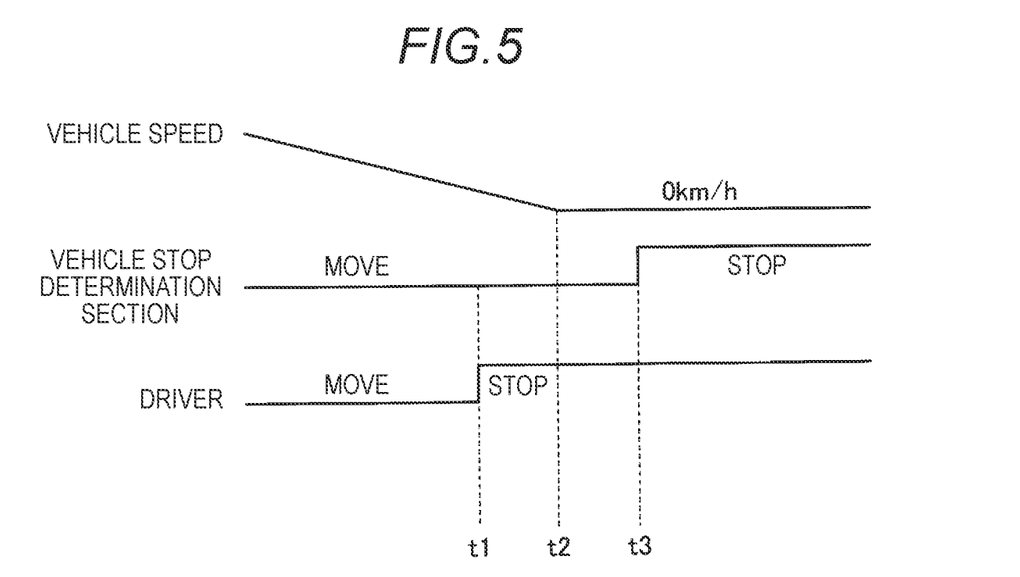
FIG. 5 is a view illustrating an example of a timing at which it is determined that the vehicle is stopped according to Embodiment 1.

FIG. 5 is a view illustrating an example of a timing at which it is determined that the vehicle is stopped according to the embodiment. A time t1 illustrated in FIG. 5 is an example of the timing at which the driver feels that the vehicle 1 is stopped. In addition, a time t2 is a timing at which the vehicle speed of the vehicle 1 becomes 0 km per hour. In addition, a time t3 is an example of a timing at which the vehicle stop determination section 143 determines that the vehicle 1 is stopped. As described above, in a case where it is determined that the rotation of the wheel 3 is in a state of being completely stopped, the vehicle stop determination section 143 determines that the vehicle 1 is in a stopped state. Therefore, the timing at which the vehicle stop determination section 143 determines that the vehicle 1 is stopped becomes later than the timing at which the vehicle speed of the vehicle 1 becomes 0 km per hour.

In addition, a configuration in which the vehicle stop determination section 143 determines that the vehicle 1 is in a stopped state by another method, may be employed. For example, a configuration in which the vehicle stop determination section 143 determines that the vehicle 1 is in a stopped state in a case where a state where the vehicle speed of the vehicle 1 is 0 km per hour continues for a predetermined period of time, may be employed.

The vehicle stop determination section 143 notifies the timer 142, the determination section 144, and the vehicle control section 145 whether or not the vehicle 1 is in a stopped state.

Returning to FIG. 4, the determination section 144 determines the presence or absence of an intention to stop the vehicle of the driver based on the traveling state of the vehicle 1 or the operation performed by the driver of the vehicle 1. In the embodiment, the traveling state of the vehicle 1 includes the vehicle speed of the vehicle 1. In addition, in the embodiment, the operation performed by the driver of the vehicle 1 includes a brake operation performed by the driver as an example.

Specifically, the determination section 144 obtains the sensing signal based on the operation input of the brake pedal (brake operation section 6) from the brake sensor 18b or the brake system 18. The determination section 144 determines the presence or absence of the brake operation performed by the driver by the sensing signal. In addition, the determination section 144 obtains the sensor value which shows the wheel speed from the wheel speed sensor 22. The determination section 144 calculates the vehicle speed of the vehicle 1 based on the wheel speed. In addition, the determination section 144 compares the calculated vehicle speed and a threshold value. The threshold value of the vehicle speed is, for example, 1 km per hour, but is not limited thereto. A configuration in which the threshold value of the vehicle speed is stored in the storage section 150 may be employed. In the embodiment, the determination section 144 determines that the driver has the intention to stop the vehicle in a case where the brake operation is performed by the driver and the vehicle speed of the vehicle 1 is equal to or lower than the threshold value. The determination section 144 sends out the determination result about the presence or absence of the intention to stop the vehicle, to the timer 142 and the vehicle control section 145.

The vehicle control section 145 controls the vehicle 1. For example, the vehicle control section 145 performs the parking assist as an example of the control. The parking assist is driving assist for parking the vehicle 1 at a target parking position, and for example, includes detection of the position at which the parking is possible and traveling in which automatic steering and creeping are used. The vehicle control section 145 executes the plural modes of parking assist. Each mode respectively corresponds to parking methods different from each other. Specifically, the vehicle control section 145 of the embodiment executes two types of parking assist modes, such as a garage entering parking assist mode and a parallel parking assist mode.

The garage entering parking assist mode is one aspect of the parking assist, and is a control for assisting the garage entering parking (double parking) of the vehicle 1. Specifically, the garage entering parking assist mode is a control in which the vehicle control section 145 parks the vehicle 1 in a parking section or a garage in which the vehicle is arranged to be aligned in parallel to other vehicles. The garage entering parking assist mode is an example of a first control in the embodiment.

In addition, the parallel parking assist mode is another aspect of the parking assist, and is a control for assisting the parallel parking of the vehicle 1. The parallel parking assist mode is an example of a second control in the embodiment.

In a case where the garage entering parking assist mode is started (executed), the vehicle control section 145 distinguishes a mark line or the like which is shown on the road surface around the vehicle 1, for example, from the imaged image data obtained by the imaging performed by the imaging section 15. The vehicle control section 145 detects (extracts) the parking section which is shown by the distinguished mark line or the like as the region in which the parking is possible. The vehicle control section 145 controls the display of the monitor device 11 via the display control section 14d, and displays the region in which the parking is possible on the monitor device 11. In addition, when the driver selects the region in which the parking is possible displayed on the monitor device 11 as the target parking position, the vehicle control section 145 moves the vehicle 1 forward, for example, by the traveling which used the creeping. In addition, the vehicle control section 145 moves the vehicle 1 rearward by switching the speed change operation section 7, adjusts the advancing direction of the vehicle 1 by the automatic steering by sending the control signal to the steering system 13, and guides the vehicle 1 to the target parking position.

In addition, in a case where the vehicle 1 is an electric car, a hybrid car or the like, the vehicle control section 145 may guide the vehicle 1 by allowing the vehicle 1 to travel at a low speed by the motor control. In addition, the vehicle control section 145 may show that the guiding by the rearward movement is started on the monitor device 11 instead of automatic performing of the switching of the speed change operation section 7, and may show the display for urging the driver to perform the operation of the switching of the speed change operation section 7.

Figure 6:
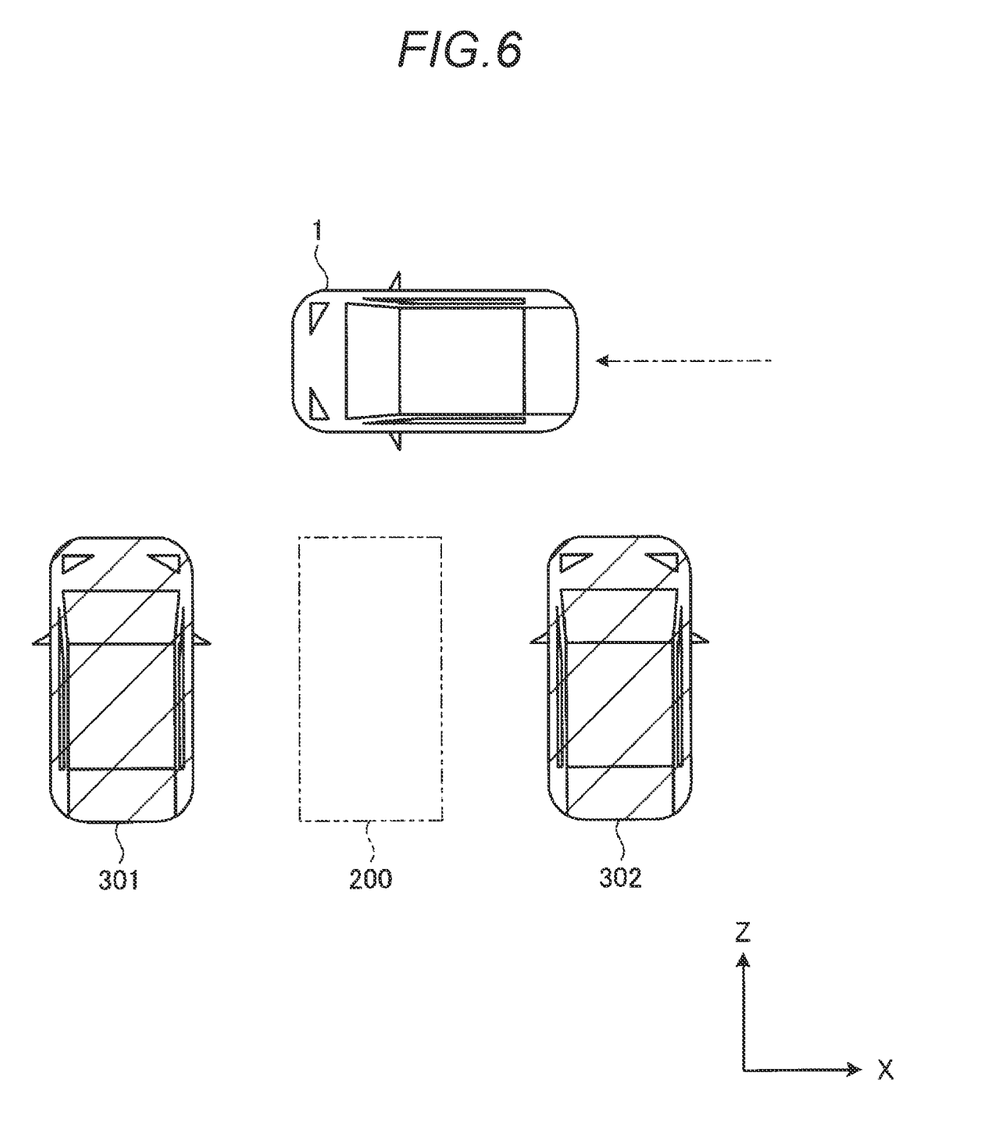
FIG. 6 is a plan view illustrating an example of a position at which the vehicle is stopped in a garage entering parking assist mode according to Embodiment 1.

In the traveling in which the automatic steering and the creeping are used by the vehicle control section 145, traveling path is determined in advance. Therefore, in a case where the garage entering parking assist mode is started, the vehicle 1 is stopped at a predetermined position with respect to the target parking position. FIG. 6 is a plan view illustrating an example of the vehicle stop position of the vehicle 1 in the garage entering parking assist mode according to the embodiment. For example, as illustrated in FIG. 6, a region in which the parking is possible 200 which is a space in which the vehicle 1 can be parked exists between other vehicles 301 and 302. In a case where the region in which the parking is possible 200 is the target parking position, the driver stops the vehicle 1 at a predetermined vehicle stop position which is in a predetermined positional relationship with respect to the region in which the parking is possible 200. As an example, as illustrated in FIG. 6, the predetermined vehicle stop position is a position at which a side surface in the longitudinal direction of the vehicle 1 faces a front surface of the region in which the parking is possible 200, but is not limited thereto.

In addition, a configuration in which the vehicle control section 145 displays the contents on the monitor device 11, and finishes the garage entering parking assist mode in a case where the region in which the parking is possible 200 does not exist in a predetermined range from the vehicle stop position of the vehicle 1, may be employed. The vehicle control section 145 can detect the region in which the parking is possible 200 with high accuracy by detecting the region in which the parking is possible 200 in a state where the vehicle 1 is stopped, and can guide the vehicle 1 with high accuracy to the target parking position.

Meanwhile, in a case where the vehicle control section 145 starts (executes) the parallel parking assist mode, the automatic steering or the like is not started immediately, and the traveling of the vehicle 1 performed by the driver continues. For example, after the parallel parking assist mode is started, in a state where the vehicle 1 travels by the driver, the vehicle control section 145 searches for the region in which the parking is possible from the side of the vehicle 1. The vehicle control section 145 displays the detected region in which the parking is possible on the monitor device 11. In addition, when the driver selects the region in which the parking is possible displayed on the monitor device 11 as the target parking position, the vehicle control section 145 displays a message or the like which urges the driver to stop the vehicle on the monitor device 11. Otherwise, the vehicle control section 145 may control the voice output device 9, and may urge the driver to stop the vehicle by making a voice or a beep sound. When the driver stops the vehicle 1, the vehicle control section 145 guides the vehicle 1 to the target parking position by the traveling or the like in which the automatic steering and the creeping are used. In addition, a configuration in which the vehicle control section 145 displays the contents on the monitor device 11 in a case where the region in which the parking is possible cannot be detected for a predetermined period of time or longer, and the parallel parking assist mode is finished, may be employed.

The vehicle control section 145 selects which one of the garage entering parking assist mode and the parallel parking assist mode is started according to the number of times of operations of the switch 27. For example, when the switch 27 is operated one time in a state where none of the parking assist mode is started, the vehicle control section 145 starts the garage entering parking assist mode. In addition, when the switch 27 is operated one more time, the vehicle control section 145 starts the parallel parking assist mode. In addition, when the switch 27 is further operated one more time, the vehicle control section 145 cancels the operation input, and returns to a state where none of the parking assist mode is started. In other words, the vehicle control section 145 switches the control of "start of garage entering parking assist mode", "start of parallel parking assist mode", and "cancel of parking assist mode" in order every time when the switch 27 is operated.

However, the start of the garage entering parking assist mode by the vehicle control section 145 is not limited only to the operation of the switch 27, but to a case where a predetermined condition is satisfied. Specifically, the vehicle control section 145 of the embodiment starts the garage entering parking assist mode in a case where the switch 27 is operated in a state where the vehicle 1 is stopped. In addition, the vehicle control section 145 of the embodiment starts the garage entering parking assist mode in a case where the determination section 144 determines that the driver has the intention to stop the vehicle and the vehicle 1 is stopped within the certain period of time after the switch 27 is operated.

The reason why the vehicle control section 145 sets such conditions is that, for example, it is desirable that the vehicle 1 is stopped at a time point of switching from the driving performed by the driver to the traveling in which the automatic steering and the creeping are used by the vehicle control section 145, from the viewpoint of the control of the vehicle 1. In addition, after the vehicle 1 is stopped, as the vehicle control section 145 detects the region in which the parking is possible 200, the vehicle control section 145 can set the target parking position of the vehicle 1 with high accuracy. Therefore, in a case where the switch 27 is operated after the vehicle 1 is stopped, the vehicle control section 145 of the embodiment starts the garage entering parking assist mode. In addition, at the time point at which the switch 27 is operated, even when the vehicle 1 is not stopped, the vehicle 1 may be stopped at the time point at which the vehicle control section 145 starts the garage entering parking assist mode. Therefore, the vehicle control section 145 starts the garage entering parking assist mode in a case where the determination section 144 determines that the driver has the intention to stop the vehicle and the vehicle 1 is stopped within a certain period of time after the switch 27 is operated.

Meanwhile, in a case where the switch 27 is operated, in a case where the predetermined condition for starting the garage entering parking assist mode is not satisfied, the vehicle control section 145 starts the parallel parking assist mode. In other words, in this case, the vehicle control section 145 skips "start of garage entering parking assist mode", and executes the control of "start of parallel parking assist mode".

Even after the vehicle control section 145 starts the parallel parking assist mode, the traveling of the vehicle 1 performed by the driver continues. Therefore, at the time point of the start of the parallel parking assist mode, the vehicle 1 may not be stopped. The vehicle control section 145 starts the parallel parking assist mode in a case where the determination section 144 determines that the driver does not have the intention to stop the vehicle, or in a case where the vehicle 1 is not stopped within the certain period of time after the switch 27 is operated. In addition, the vehicle control section 145 starts the parallel parking assist mode in a case where the switch 27 is operated two times in a state where none of the parking assist mode is started.

The contents of the control in the garage entering parking assist mode and the parallel parking assist mode which are performed by the vehicle control section 145 of the embodiment is an example and is not limited thereto. In addition, the vehicle control section 145 may guide the vehicle 1 to the target parking position by the forward parking not being limited to the rearward parking in the garage entering parking assist mode. In addition, a configuration in which the vehicle control section 145 determines the region in which the parking is possible 200 or the traveling path of the vehicle 1 based on the information obtained from a sonar or the like which is not illustrated that emits ultrasonic waves and catches the reflected wave, may be employed. For example, a configuration in which the vehicle control section 145 steers the vehicle 1 to avoid an obstacle around the vehicle 1, may be employed.

In addition, the vehicle control section 145 in the embodiment is described as a section which displays the region in which the parking is possible 200 or the like on the monitor device 11, but a configuration in which the vehicle control section 145 displays the region in which the parking is possible 200 or the like on the display device 12, may be employed.

An order of switching the control of the vehicle control section 145 is an example, and is not limited thereto. For example, a configuration in which the vehicle control section 145 switches the control of "start of parallel parking assist mode", "start of garage entering parking assist mode", and "cancel of parking assist mode" in order, may be employed. In addition, the vehicle control section 145 may be provided with another type of parking assist mode.

Figure 7:
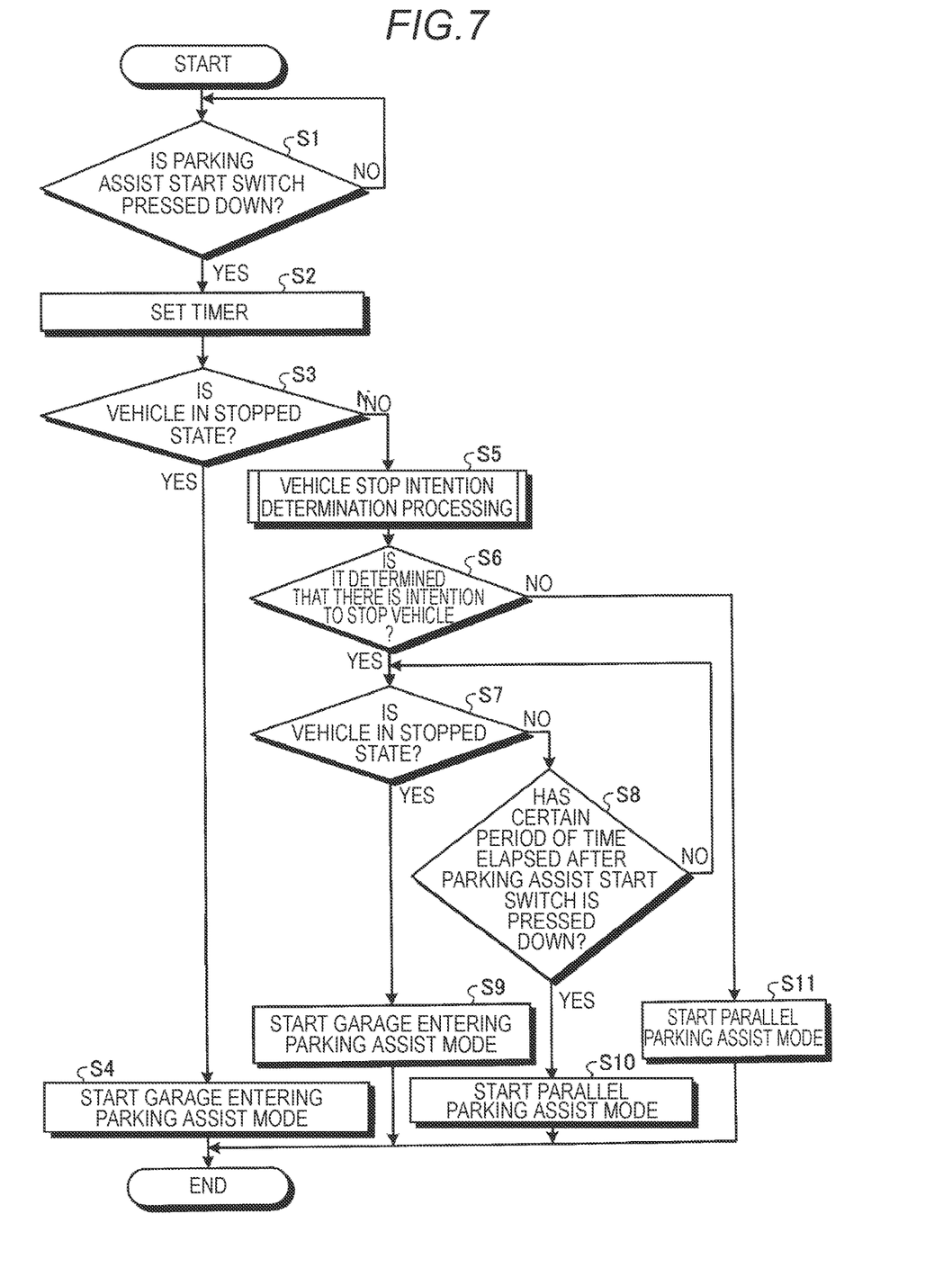
FIG. 7 is a flowchart illustrating an example of an order of determination processing of the parking assist mode according to Embodiment 1.

Next, decision processing of the parking assist mode of the embodiment configured as described above will be described. FIG. 7 is a flowchart illustrating an example of the order of the decision processing of the parking assist mode according to the embodiment. The processing of the flowchart is started, for example, in a case where an ignition power source of the vehicle 1 is ON and in a case where none of the parking assist mode is started.

The receiving section 141 determines whether or not the switch 27 (parking assist start switch) is operated by the driver (S1). In a case where the switch 27 is not operated ("NO" in S1), the receiving section 141 repeats the processing of S1 and stands by. In addition, in a case where the switch 27 is operated ("YES" in S1), the receiving section 141 notifies the timer 142, the vehicle stop determination section 143, and the vehicle control section 145 that the switch 27 is operated.

The timer 142 sets the timer and starts the clocking in a case where it is notified that the switch 27 is operated, from the receiving section 141 (S2).

The vehicle stop determination section 143 determines whether or not the vehicle 1 is in a stopped state (S3). In a case where the vehicle stop determination section 143 determines that the vehicle 1 is in a stopped state ("YES" in S3), it is notified that the switch 27 is operated in a state where the vehicle 1 is stopped to the vehicle control section 145.

In a case where the switch 27 is operated in a state where the vehicle 1 is stopped, the vehicle control section 145 starts the garage entering parking assist mode (S4).

In addition, in a case where the vehicle stop determination section 143 determines that the vehicle 1 is not in a stopped state ("NO" in S3), the contents are notified to the determination section 144. In a case where the switch 27 is operated in a state where the vehicle 1 is not stopped, the determination section 144 starts vehicle stop intention determination processing (S5).

Figure 8:
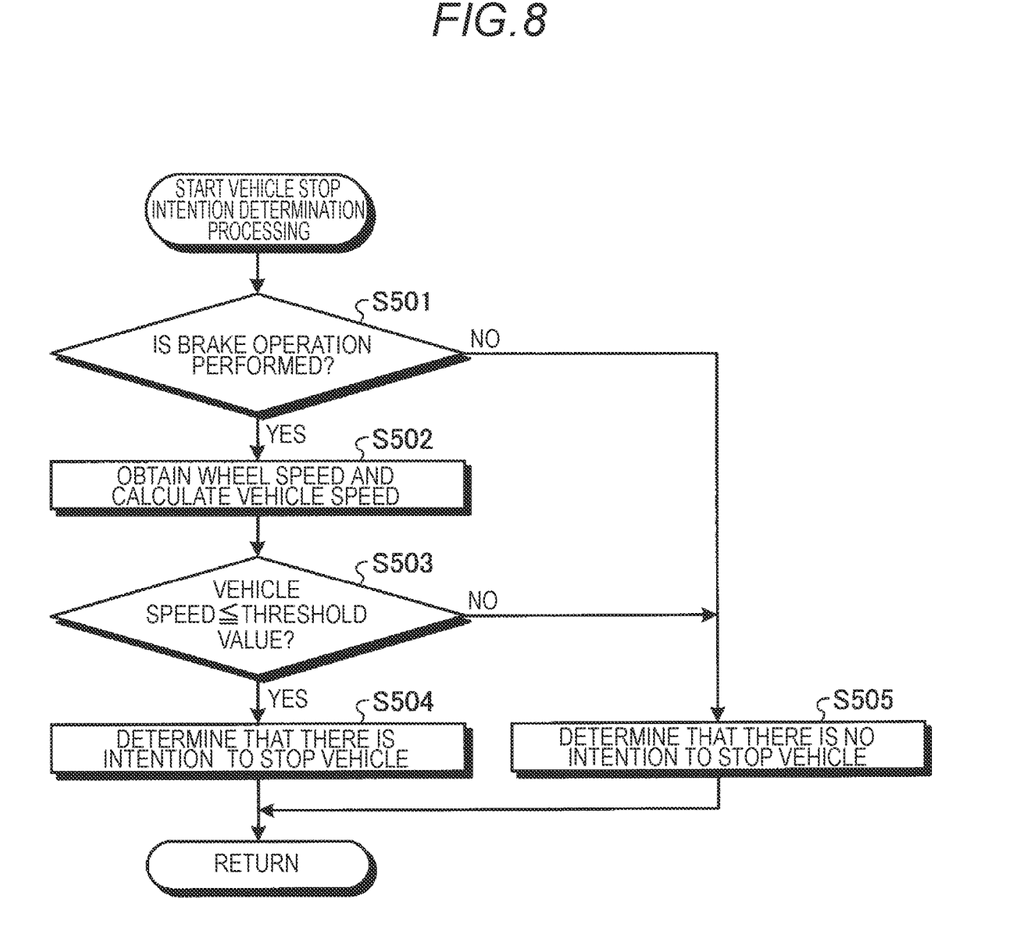
FIG. 8 is a flowchart illustrating an example of an order of vehicle stop intention determination processing according to Embodiment 1.

Here, the vehicle stop intention determination processing of S5 will be described by using FIG. 8. FIG. 8 is a flowchart illustrating an example of an order of the vehicle stop intention determination processing according to the embodiment.

First, the determination section 144 obtains the sensing signal based on the operation input of the brake pedal from the brake sensor 18b, and determines whether or not a brake operation is performed by the driver (S501).

In a case where the brake operation is performed by the driver ("YES" in S501), the determination section 144 obtains the wheel speed from the wheel speed sensor 22, and calculates the vehicle speed of the vehicle 1 (S502). In addition, the determination section 144 compares the calculated vehicle speed and the threshold value to each other (S503). In a case where the vehicle speed of the vehicle 1 is equal to or lower than the threshold value ("YES" in S503), the determination section 144 determines that there is the intention to stop the vehicle (S504).

In addition, in a case where the brake operation is not performed by the driver ("NO" in S501), or in a case where the vehicle speed of the vehicle 1 is higher than the threshold value ("NO" in S503), the determination section 144 determines that there is no intention to stop the vehicle (S505).

When the determination section 144 determines the presence or absence of the intention to stop the vehicle of the driver, the processing of the flowchart is finished, and the process returns to the processing of the flowchart of FIG. 7.

In the vehicle stop intention determination processing of S5, in a case where the determination section 144 determines that there is the intention to stop the vehicle ("YES" in S6), the vehicle stop determination section 143 determines whether or not the vehicle 1 is in a stopped state (S7). In a case where the vehicle stop determination section 143 determines that the vehicle 1 is in a stopped state ("YES" in S7), it is notified that the vehicle 1 is in a stopped state to the vehicle control section 145.

In a case where the vehicle 1 is stopped within the certain period of time after the switch 27 is operated ("YES" in S7), the vehicle control section 145 starts the garage entering parking assist mode (S9).

In addition, in a case where the vehicle 1 is not in a stopped state ("NO" in S7), the vehicle stop determination section 143 notifies the timer 142 of the contents. The timer 142 determines whether or not the certain period of time has elapsed after the switch 27 (parking assist start switch) is pressed down (S8).

In a case where the certain period of time has not elapsed ("NO" in S8) after the switch 27 is pressed down, the timer 142 notifies the vehicle stop determination section 143 of the contents. Until the certain period of time elapses after the switch 27 is pressed down, the vehicle stop determination section 143 and the timer 142 repeat the processing of S7 and S8.

In a case where a state where the vehicle 1 is not stopped continues ("NO" in S7), and the certain period of time has elapsed after the switch 27 is pressed down ("YES" in S8), the timer 142 notifies the vehicle control section 145 that the certain period of time has elapsed.

In a case where the switch 27 is pressed down and the vehicle 1 is not stopped within a certain period of time ("NO" in S7 and "YES" in S8), the vehicle control section 145 starts the parallel parking assist mode (S10).

In addition, in the vehicle stop intention determination processing of S5, in a case where the determination section 144 determines that there is no intention to stop the vehicle ("NO" in S6), the determination section 144 notifies the vehicle control section 145 of the determination result. In this case, the vehicle control section 145 starts the parallel parking assist mode without standing by until the certain period of time elapses (S11).

In this manner, in the embodiment, the timer 142 clocks the time until the certain period of time elapses after the switch 27 is operated. In addition, in a case where the vehicle 1 is stopped within the certain period of time after the switch 27 is operated, the vehicle control section 145 starts the garage entering parking assist mode. Therefore, according to the ECU 14 of the embodiment, without changing the timing at which the vehicle stop determination section 143 determines that the vehicle is stopped, it is possible to execute the control according to the intention of the driver.

For example, as illustrated in FIG. 5, in a case where there is a gap between the time t1 at which the driver feels that the vehicle 1 is stopped and the time t3 at which the vehicle stop determination section 143 determines that the vehicle 1 is stopped, the driver operates the switch 27 at the time point of the time t1. In this case, since the driver feels that the vehicle 1 is stopped, the driver intends to start the garage entering parking assist mode and operates the switch 27. In this case, a time difference from the time t1 to the time t3 is within the certain period of time, the vehicle control section 145 starts the garage entering parking assist mode, and thus, it is possible to execute the control according to the intention of the driver.

In addition, according to the ECU 14 of the embodiment, the driver can operate the switch 27 without standing by until the time t3 illustrated in FIG. 5. Therefore, according to the ECU 14 of the embodiment, it is possible to reduce the feeling of awkwardness of the driver at the operation timing. In other words, according to the ECU 14 of the embodiment, without changing the timing at which the vehicle stop determination section 143 determines that the vehicle is stopped, it is possible to receive the operation at the timing which is close to the timing at which the driver feels that the vehicle 1 is stopped. In addition, according to the ECU 14 of the embodiment, it is possible to prevent a case where a mode different from the intention of the driver is started even when the driver feels that the vehicle 1 is stopped and operates the switch 27. Therefore, according to the ECU 14 of the embodiment, it is possible to improve convenience of the operation.

Furthermore, in the embodiment, the determination section 144 determines the presence or absence of the intention to stop the vehicle of the driver based on the traveling state of the vehicle 1 and the operation performed by the driver of the vehicle 1. In addition, in a case where the determination section 144 determines that the driver has the intention to stop the vehicle and the vehicle 1 is stopped within the certain period of time after the switch 27 is operated, the vehicle control section 145 starts the garage entering parking assist mode. Therefore, according to the ECU 14 of the embodiment, in a case where the driver does not have the intention to stop the vehicle, it is not necessary to stand by until the certain period of time elapses, and it is possible to more rapidly determine whether to start the garage entering parking assist mode.

In addition, in the embodiment, the determination section 144 determines that the driver has the intention to stop the vehicle in a case where the brake operation is performed by the driver and the vehicle speed of the vehicle 1 is equal to or lower than the threshold value. Therefore, according to the ECU 14 of the embodiment, it is possible to determine not only that the vehicle 1 travels at a low speed but also that the driver has the intention to stop the vehicle 1, with high accuracy.

In addition, in the embodiment, in a case where the determination section 144 determines that the driver does not have the intention to stop the vehicle, or in a case where the vehicle 1 is not stopped within the certain period of time after the switch 27 is operated, the vehicle control section 145 starts the parallel parking assist mode. Therefore, according to the ECU 14 of the embodiment, in a case where the driver does not have the intention to stop the vehicle, without standing by until the certain period of time elapses, it is possible to start the parallel parking assist mode.

Therefore, according to the ECU 14 of the embodiment, in a case where the driver expects the start of the parallel parking assist mode and operates the switch 27, it is possible to rapidly start the control expected by the driver.

In addition, as described above, the first control in the embodiment is the garage entering parking assist mode, and the second control is the parallel parking assist mode. According to the ECU 14 of the embodiment, in a case where the driver selects any of the plural parking assist modes by one switch 27, it is possible to start the parking assist mode intended by the driver.

Embodiment 2

In Embodiment 1, the switch 27 is a parking assist start switch for receiving the operation of starting any of the garage entering parking assist mode or the parallel parking assist mode. In Embodiment 2, the switch 27 is a dedicated switch for receiving the operation of starting the garage entering parking assist mode.

The switch 27 of the embodiment is a garage entering parking assist start switch. Other configurations of the vehicle 1 according to the embodiment are similar to the configurations of Embodiment 1 described in FIGS. 1 and 2. The hardware configuration of the vehicle control system 100 and the ECU 14 according to the embodiment is similar to the configuration of Embodiment 1 described in FIG. 3.

In addition, similar to Embodiment 1 described in FIG. 4, the ECU 14 according to the embodiment includes the receiving section 141, the timer 142, the vehicle stop determination section 143, the determination section 144, the vehicle control section 145, and the storage section 150. The receiving section 141, the timer 142, the vehicle stop determination section 143, the determination section 144, and the storage section 150 have similar configurations to those of Embodiment 1 described in FIG. 4.

In addition, the vehicle control section 145 of the embodiment has a function similar to that of Embodiment 1, and in addition, in a case where the determination section 144 determines that the driver does not have the intention to stop the vehicle, or in a case where the vehicle 1 is not stopped within the certain period of time after the switch 27 is operated, the operation of garage entering parking assist start input by the switch 27 is canceled. As the vehicle control section 145 cancels the operation, the garage entering parking assist mode is not started.

In addition, a configuration in which the vehicle control section 145 of the embodiment has a plurality of parking assist modes, may be employed. In this case, the vehicle 1 may be configured to include a switch for starting other parking assist modes in addition to the switch 27.

Figure 9:
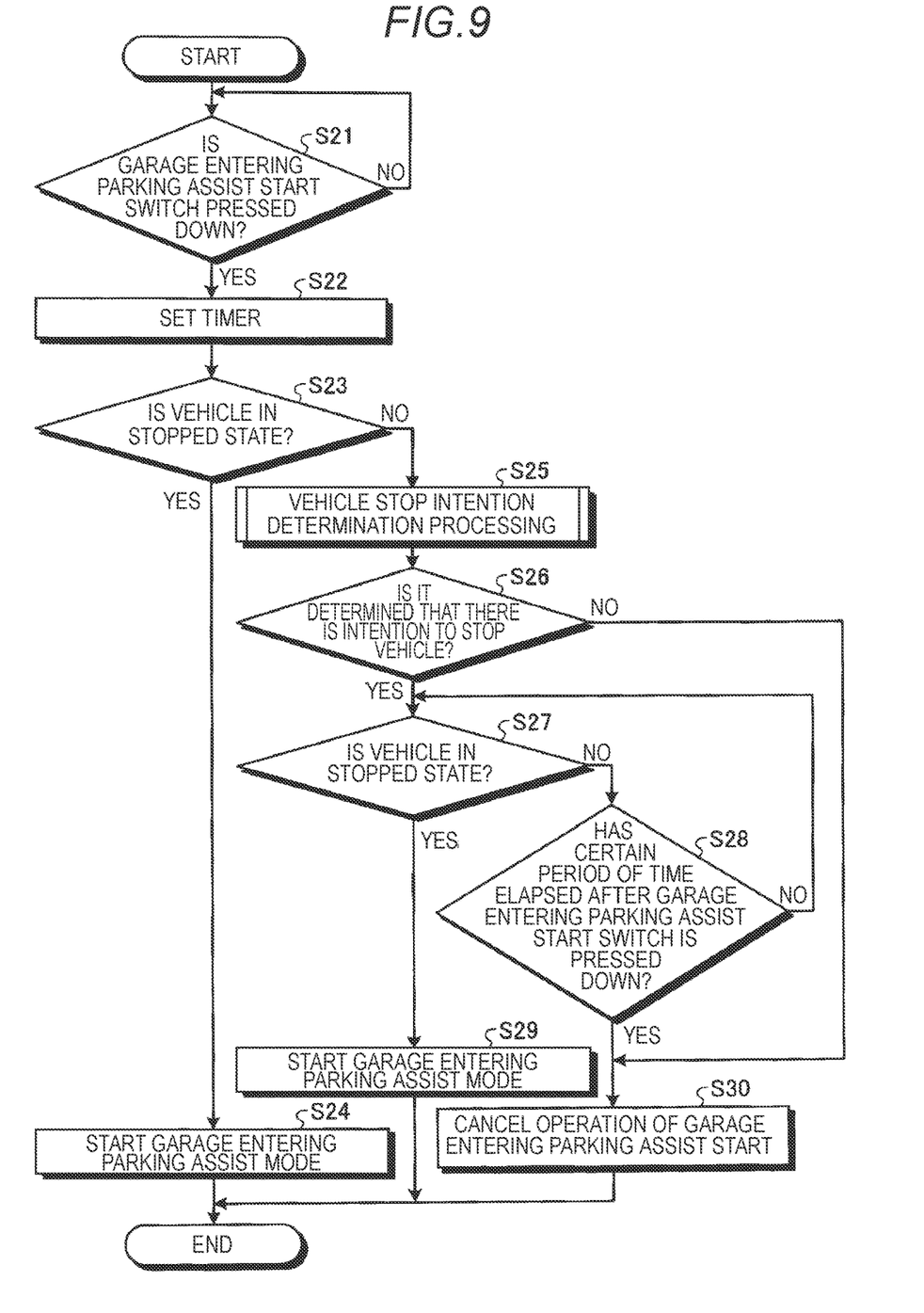
FIG. 9 is a flowchart illustrating an example of an order of processing of start determination of a garage entering parking assist mode according to Embodiment 2.

Next, processing of determining the start of the garage entering parking assist mode of the embodiment configured as described above will be described. FIG. 9 is a flowchart illustrating an example of an order of processing of determining the start of the garage entering parking assist mode according to the embodiment. The processing of the flowchart is started, for example, in a case where the ignition power source of the vehicle 1 is ON, and in a case where none of the parking assist modes is started.

The receiving section 141 determines whether or not the switch 27 (garage entering parking assist start switch) is operated by the driver (S21). In a case where the switch 27 is not operated ("NO" in S21), the receiving section 141 repeats the processing of S21 and stands by. In addition, in a case where the switch 27 is operated ("YES" in S21), the receiving section 141 notifies the timer 142, the vehicle stop determination section 143, and the vehicle control section 145 that the switch 27 is operated.

The process after the setting of the timer of S22 until the vehicle stop intention determination processing of S25 is similar to the processing of S2 to S5 of the decision processing for each type of the parking support mode according to Embodiment 1 described in FIG. 7.

In the vehicle stop intention determination processing of S25, in a case where the determination section 144 determines that there is the intention to stop the vehicle ("YES" in S26), the vehicle stop determination section 143 determines whether or not the vehicle 1 is in a stopped state (S27). In a case where the vehicle stop determination section 143 determines that the vehicle 1 is in a stopped state ("YES" in S27), the vehicle stop determination section 143 notifies the vehicle control section 145 that the vehicle 1 is in a stopped state.

In a case where the vehicle 1 is stopped within the certain period of time after the switch 27 is operated ("YES" in S27), the vehicle control section 145 starts the garage entering parking assist mode (S29).

In addition, in a case where the vehicle stop determination section 143 determines that the vehicle 1 is not in a stopped state ("NO" in S27), the vehicle stop determination section 143 notifies the timer 142 of the contents. The timer 142 determines whether or not the certain period of time has elapsed after the switch 27 (garage entering parking assist start switch) is pressed down.

In a case where the certain period of time has not elapsed after the switch 27 is pressed down ("NO" in S28), the timer 142 notifies the vehicle stop determination section 143 of the contents. After the switch 27 is pressed down until the certain period of time elapses, the vehicle stop determination section 143 and the timer 142 repeat the processing of S27 and S28.

In a case where a state where the vehicle 1 is not stopped continues ("NO" in S27), and in a case where the certain period of time has elapsed after the switch 27 is pressed down ("YES" in S28), the timer 142 notifies the vehicle control section 145 that the certain period of time has elapsed.

In a case where the vehicle 1 is not stopped within the certain period of time after the switch 27 is pressed down ("NO" in S27 and "YES" in S28), the vehicle control section 145 cancels the operation of the garage entering parking assist start (S30).

In addition, in the vehicle stop intention determination processing of S25, in a case where the determination section 144 determines that there is no intention to stop the vehicle ("NO" in S26), the determination section 144 notifies the vehicle control section 145 of the determination result. In this case, the vehicle control section 145 cancels the operation of the garage entering parking assist start without standing by until the certain period of time elapses (S30).

In this manner, in the embodiment, in a case where the determination section 144 determines that the driver does not have the intention to stop the vehicle, or in a case where the vehicle 1 is not stopped within the certain period of time after the switch 27 is operated, the vehicle control section 145 cancels the operation input by the switch 27. Therefore, according to the ECU 14 of the embodiment, in addition to the effects similar to those of Embodiment 1, it is possible to prevent the start of the garage entering parking assist mode against the intention of the driver. For example, according to the ECU 14 of the embodiment, in a case where the driver mistakenly operates the switch 27, or in a case where the plan is changed and the traveling continues after the switch 27 is operated, the operation is canceled. Therefore, according to the ECU 14 of the embodiment, it is possible to prevent the start of the garage entering parking assist mode against the intention of the driver.

Modification Example 1

In the ECU 14 of Embodiment 1 and Embodiment 2, the presence or absence of the intention to stop the vehicle of the driver is determined from the presence or absence of the brake operation performed by the driver and the vehicle speed of the vehicle 1, but the condition of determination of the presence or absence of the intention to stop the vehicle of the driver, is not limited thereto. For example, a configuration in which the determination section 144 uses the acceleration of the vehicle 1 instead of the presence or absence of the brake operation performed by the driver in determining the presence or absence of the intention to stop the vehicle of the driver, may be employed.

Specifically, the determination section 144 obtains the acceleration in the forward-rearward direction of the vehicle 1 from the acceleration sensor 26, and determines whether or not the vehicle 1 is decelerated. In addition, the determination section 144 obtains a sensor value which shows the wheel speed from the wheel speed sensor 22. The determination section 144 calculates the vehicle speed of the vehicle 1 based on the wheel speed, and compares the calculated value with the threshold value. The determination section 144 determines that the driver has the intention to stop the vehicle in a case where the deceleration of the vehicle 1 is detected from the acceleration in the forward-rearward direction of the vehicle 1 and the vehicle speed of the vehicle 1 is equal to or lower than the threshold value. In other words, the traveling state of the vehicle 1 of the modification example includes the acceleration in the forward-rearward direction of the vehicle 1 and the vehicle speed of the vehicle 1, and the determination section 144 determines the presence or absence of the intention to stop the vehicle of the driver based on the traveling state of the vehicle 1.

According to the ECU 14 of the modification example, in addition to the effects similar to those of Embodiment 1, since the determination section 144 determines whether or not the vehicle 1 is practically decelerated from the acceleration in the forward-rearward direction of the vehicle 1, and determines the presence or absence of the intention to stop the vehicle of the driver, more objective determination is possible based on the behavior of the vehicle.

In addition, a configuration in which the determination section 144 calculates the acceleration in the forward-rearward direction of the vehicle 1 not from the measurement result obtained from the acceleration sensor 26 but from the change in vehicle speed of the vehicle 1, may be employed. In addition, a configuration in which the traveling state of the vehicle 1 includes other measurement values or the like not being limited to the vehicle speed and the acceleration of the vehicle 1, may be employed. In addition, in the ECU 14 of Embodiment 1 and Embodiment 2, an example of the operation performed by the driver of the vehicle 1 includes the brake operation performed by the driver, but not being limited thereto, other operations may be employed as a condition of determination of the presence or absence of the intention to stop the vehicle of the driver.

Modification Example 2

In addition, in the ECU 14 of Embodiment 1 and Embodiment 2, in a case where the determination section 144 determines that there is no intention to stop the vehicle, the timer 142 and the vehicle stop determination section 143 determine whether or not the vehicle 1 is stopped within the certain period of time after the switch 27 is operated, but the disclosure is not limited thereto. For example, the ECU 14 may employ a configuration in which the vehicle control section 145 starts the garage entering parking assist mode in a case where the determination section 144 does not determine the presence or absence of the intention to stop the vehicle and the vehicle 1 is stopped within the certain period of time after the switch 27 is operated. According to the ECU 14 of the modification example, in addition to the effects similar to those of Embodiment 1, by a simpler configuration, without changing the timing at which the vehicle stop determination section 143 determines that the vehicle is stopped, it is possible to execute the control according to the intention of the driver.

Modification Example 3

In the ECU 14 of Embodiment 1 and Embodiment 2, an example of the control of the vehicle 1 is the parking assist, but the disclosure is not limited thereto. For example, the control which is executed by the vehicle control section 145 may be the switching of the mode of the navigation system. In addition, the operation section may not be the push button type switch 27, and may be an image displayed on the touch panel of the monitor device 11.

Specifically, for example, the first control allows the operation input of a change or the like of a destination by switching the navigation system into an input mode in which the input operation is possible. Specifically, in a case where the operation section displayed on the monitor device 11 is operated after the vehicle 1 is stopped, the vehicle control section 145 switches the mode of the navigation system into the input mode in which the operation input of the change or the like of the destination is possible, from the navigation mode which does not receive the operation input. In addition, a configuration in which the vehicle control section 145 switches the system into the input mode in a case where the determination section 144 determines that the driver has the intention to stop the vehicle and the vehicle 1 is stopped within the certain period of time after the operation section is operated even when the vehicle 1 is not stopped at the time point at which the operation section is operated, may be employed.

Otherwise, the first control which is executed by the vehicle control section 145 may be a control of switching the display of the monitor device 11 from a navigation screen to a viewing screen of a video, such as television programs. For example, in a case where the operation section displayed on the monitor device 11 is operated in a state where the vehicle 1 is stopped during the start of the navigation system, the vehicle control section 145 switches the display of the monitor device 11 into the viewing screen. In addition, the vehicle control section 145 switches the display of the monitor device 11 into the viewing screen in a case where the determination section 144 determines that the driver has the intention to stop the vehicle and the vehicle 1 is stopped within the certain period of time after the operation section is operated even when the vehicle 1 is not stopped at the time point at which the operation section is operated.

According to the modification example, in addition to the effects similar to those of Embodiment 1, it is possible to improve convenience of the operation of the navigation system and the monitor device 11.

Modification Example 4

Otherwise, the first control executed by the vehicle control section 145 may be a brake hold. The brake hold is a function of holding the stopped state of the vehicle even when the driver separates the foot from the brake pedal. In a case where the configuration is employed, when the switch 27 is operated after the vehicle 1 is stopped, the vehicle control section 145 controls the brake system 18 and executes the brake hold. The vehicle control section 145 executes the brake hold in a case where the determination section 144 determines that the driver has the intention to stop the vehicle and the vehicle 1 is stopped within the certain period of time after the switch 27 is operated even when the vehicle 1 is not stopped at the time point at which the switch 27 is operated.

According to the ECU 14 of the modification example, without changing the timing at which the vehicle stop determination section 143 determines that the vehicle is stopped, it is possible to execute the control according to the intention of the driver. In addition, according to the ECU 14 of the modification example, at the timing which is close to the timing at which the driver feels that the vehicle 1 is stopped, it is possible to receive the start operation of the brake hold performed by the driver.

In this manner, not being limited to the parking assist, regarding a specific control executed in a case where the operation section is operated after the vehicle 1 is stopped, the function of the ECU 14 described in Embodiment 1 and Embodiment 2 can be employed.

As stated above, several embodiments of the disclosure are described as examples, but the above-described embodiments and modification examples are merely examples, and do not intend to limit the range of the disclosure. The above-described embodiments and modification examples can be realized by various aspects, and can be omitted, replaced, combined, and changed in various manners within the range that does not depart from the spirit of the disclosure. In addition, the configurations or the shapes of each of the embodiments and each of the modification examples can also be realized by partial replacement.

As an example, a vehicle control apparatus according to an aspect of this disclosure includes: a clocking section which clocks time after an operation section is operated until a certain period of time elapses; and a vehicle control section which starts a first control in a case where a vehicle is stopped within the certain period of time after the operation section is operated, the first control corresponding to a control executed in a case where the operation section is operated in a state where the vehicle is stopped. Accordingly, as an example, according to the vehicle control apparatus, it is possible to execute the control according to the intention of the driver without changing the timing at which a vehicle stop determination section determines that the vehicle is stopped.

The vehicle control apparatus may further include, as an example, a determination section which determines the presence or absence of intention to stop the vehicle of a driver, based on a traveling state of the vehicle or an operation performed by the driver of the vehicle. In addition, the vehicle control section of the vehicle control apparatus may start the first control in a case where the determination section determines that the driver has the intention to stop the vehicle and the vehicle is stopped within the certain period of time after the operation section is operated. Accordingly, as an example, according to the vehicle control apparatus, in a case where the driver does not have the intention to stop the vehicle, the vehicle may not stand by until the certain period of time elapses, and it is possible to more rapidly perform the determination about whether to start the first control.

In the vehicle control apparatus, as an example, the traveling state may include a vehicle speed of the vehicle, and the operation may include a brake operation performed by the driver. In addition, as an example, the determination section of the vehicle control apparatus may determine that the driver has the intention to stop the vehicle in a case where the brake operation is performed by the driver and the vehicle speed of the vehicle is equal to or lower than a threshold value. Accordingly, as an example, according to the vehicle control apparatus, it is possible to distinguish not only that the vehicle travels at a low speed but also that the driver has the intention to stop the vehicle with high accuracy.

In the vehicle control apparatus, as an example, the traveling state may include an acceleration in a forward-rearward direction of the vehicle and a vehicle speed of the vehicle. In addition, the determination section of the vehicle control apparatus may determine that the driver has the intention to stop the vehicle in a case where it is detected that the vehicle is decelerated from the acceleration in the forward-rearward direction of the vehicle and the vehicle speed of the vehicle is equal to or lower than the threshold value. Accordingly, as an example, according to the vehicle control apparatus, since it is determined whether or not the vehicle is practically decelerated and the presence or absence of the intention to stop the vehicle of the driver is determined, more objective determination is possible based on the behavior of the vehicle.

In the vehicle control apparatus, as an example, the vehicle control section may start a second control which is a control different from the first control in a case where the determination section determines that the driver does not have the intention to stop the vehicle or the vehicle is not stopped within the certain period of time after the operation section is operated. Accordingly, as an example, according to the vehicle control apparatus, it is possible to start the second control without standing by until a certain period of time elapses in a case where the driver does not have the intention to stop the vehicle. Therefore, as an example, according to the vehicle control apparatus, it is possible to rapidly start the second control expected by the driver in a case where the driver expects the start of the second control and operates the operation section.

In the vehicle control apparatus, as an example, the first control may be a control for assisting garage entering parking of the vehicle, and the second control may be a control for assisting parallel parking of the vehicle. Therefore, as an example, according to the vehicle control apparatus, it is possible to start the parking assist which is the type that the driver intends in a case where the driver selects any of plural types of parking assist by one operation section.

In the vehicle control apparatus, as an example, the vehicle control section may cancel an operation input by the operation section in a case where the determination section determines that the driver does not have the intention to stop the vehicle or the vehicle is not stopped within the certain period of time after the operation section is operated. Therefore, as an example, according to the vehicle control apparatus, it is possible to prevent the first control from starting against the intention of the driver.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control apparatus comprising:
a clocking section which clocks time after an operation section is operated until a certain period of time elapses;
a vehicle control section which starts a first control in a case where a vehicle is stopped within the certain period of time after the operation section is operated, the first control corresponding to a control executed in a case where the operation section is operated in a state where the vehicle is stopped; and
a determination section which determines a presence or absence of intention to stop the vehicle of a driver, based on a traveling state of the vehicle or an operation performed by the driver of the vehicle,
wherein the vehicle control section starts the first control in a case where the determination section determines that the driver has an intention to stop the vehicle and the vehicle is stopped within the certain period of time after the operation section is operated, and
wherein the vehicle control section starts a second control which is a control different from the first control in a case where the determination section determines that the driver does not have the intention to stop the vehicle or the vehicle is not stopped within the certain period of time after the operation section is operated, and
wherein the first control is a control for assisting garage entering parking of the vehicle, and
the second control is a control for assisting parallel parking of the vehicle.

2. The vehicle control apparatus according to claim 1, wherein the traveling state includes a vehicle speed of the vehicle,
the operation includes a brake operation performed by the driver, and
the determination section determines that the driver has the intention to stop the vehicle in a case where the brake operation is performed by the driver and the vehicle speed of the vehicle is equal to or lower than a threshold value.

3. The vehicle control apparatus according to claim 1, wherein the traveling state includes an acceleration in a forward-rearward direction of the vehicle and a vehicle speed of the vehicle, and
the determination section determines that the driver has the intention to stop the vehicle in a case where it is detected that the vehicle is decelerated from the acceleration in the forward-rearward direction of the vehicle and the vehicle speed of the vehicle is equal to or lower than a threshold value.

* * * * *